US007117910B2

(12) United States Patent  (10) Patent No.: US 7,117,910 B2
Akahori                    (45) Date of Patent:     Oct. 10, 2006

(54) AIR SUPPLY DEVICE, WHEEL, AND TIRE UNIT

(75) Inventor: Yutaka Akahori, Yamagata-mura (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/445,709

(22) Filed: May 27, 2003

(65) Prior Publication Data

US 2004/0025996 A1  Feb. 12, 2004

(30) Foreign Application Priority Data

May 27, 2002 (JP) .............................. 2002-152295

(51) Int. Cl.
B60C 23/10 (2006.01)
B60C 29/00 (2006.01)
(52) U.S. Cl. ...................... 152/426; 152/419
(58) Field of Classification Search ............... 152/415, 152/418–419, 421–426; 137/223–225, 331; 417/233
See application file for complete search history.

(56) References Cited

U.S. PATENT DOCUMENTS

| 868,939 | A | * | 10/1907 | Reames | 152/423 |
| 1,484,914 | A | * | 2/1924 | Thomas | 152/421 |
| 1,585,181 | A | * | 5/1926 | Bennet | 152/419 |
| 1,679,505 | A | * | 8/1928 | Stewart | 152/418 |
| 1,713,899 | A | * | 5/1929 | Gray | 152/421 |
| 1,885,284 | A | * | 11/1932 | Otto | 152/421 |
| 2,415,618 | A | * | 2/1947 | West | 417/498 |
| 2,512,766 | A | * | 6/1950 | Caldwell | 152/419 |
| 2,719,560 | A | * | 10/1955 | Caldwell | 152/419 |
| 3,327,755 | A | * | 6/1967 | Parr | 152/419 |
| 4,349,064 | A | * | 9/1982 | Booth | 152/418 |
| 5,201,968 | A | | 4/1993 | Renier | |
| 5,325,902 | A | * | 7/1994 | Loewe et al. | 152/419 |
| 5,556,489 | A | * | 9/1996 | Curlett et al. | 152/418 |
| 5,558,730 | A | * | 9/1996 | Olney et al. | 152/418 |
| 5,865,917 | A | * | 2/1999 | Loewe | 152/426 |
| 5,975,174 | A | * | 11/1999 | Loewe | 152/415 |
| 6,533,010 | B1 | * | 3/2003 | Alonso et al. | 152/419 |

FOREIGN PATENT DOCUMENTS

| JP | 06-20103 | 3/1994 |
| JP | 06-211010 | 8/1994 |

(Continued)

OTHER PUBLICATIONS

Communication from Japanese Patent Office regarding counterpart application.

*Primary Examiner*—Jason R. Bellinger
(74) *Attorney, Agent, or Firm*—Harness, Dickey & Pierce, P.L.C.

(57) ABSTRACT

An air supply device is provided on a rotating body having an air filling portion into which air is filled. The air supply device has a device body provided with a cylinder, and a piston mounted movably in the cylinder, the device body being joined at the middle of a valve so that a through-hole is communicated to a flow passage of the valve. A direction, in which the piston is moved, corresponds substantially to a radial direction of a tire unit (wheel), and the piston can be moved by a centrifugal force, which is generated by rotation of the tire unit. A latch for latching the piston is formed below the piston in the cylinder, in which a coil spring is mounted. Also, the device body is provided with an adjusting screw, check valves, and an air filter.

17 Claims, 6 Drawing Sheets

FOREIGN PATENT DOCUMENTS

| | | |
|---|---|---|
| JP | 06-510252 | 11/1994 |
| JP | 07-069017 | 3/1995 |
| JP | 09-069017 | 3/1995 |
| JP | 07-167726 | 7/1995 |
| JP | 08-462 | 3/1996 |
| JP | 3026852 | 5/1996 |
| JP | 09-150612 | 6/1997 |
| JP | 09-508870 | 9/1997 |
| JP | 2000-313215 | 11/2000 |
| JP | 2001-071726 | 3/2001 |
| JP | WO 03/066354 A1 | 8/2003 |

\* cited by examiner

AIR SUPPLY DEVICE, WHEEL, AND TIRE UNIT

CROSS-REFERENCE TO RELATED APPLICATION

This application claims priority to Japanese Patent Application No. 2002-152295 filed May 27, 2002 which is hereby expressly incorporated by reference herein in its entirety.

BACKGROUND OF THE INVENTION

1. Field of the Invention

The present invention relates to an air supply device, wheel, and a tire unit.

2. Related Art

Automobiles, bicycles, or the like are driven by rotating tires, and air pressure in the tires must be always kept in a predetermined range for safe traveling.

However, there is a problem that since air pressure in a tire is decreased with passing of time and during traveling, it is necessary to supply an air into a tire in manual operation by means of a compressor or the like and so control of air pressure in a tire takes time and labor.

In order to solve such problem, a tire pressure control system (device) has been conventionally proposed in, for example, JP-A-H07-69017.

However, the conventional device is disadvantageous in that it is complex in construction, becomes large-scaled in system, and needs a complex control for driving the device, and a battery or the like of a vehicle side is necessary as an energy source for driving the device.

An object of the invention is to provide an air supply device, which is simple in construction and can automatically and surely supply air into an air filling portion of a rotating body without the use of any energy source (for example, sources of electricity, fuel, high pressure, or the like), a wheel, and a tire unit.

SUMMARY OF THE INVENTION

In accordance with the teachings of the present invention, an air supply device is provided on a rotating body having an air filling portion into which air is filled, to supply air into the air filling portion, characterized in that the air supply device comprises a cylinder and a piston and the piston is moved by a centrifugal force generated by rotation of the rotating body to supply air into the air filling portion.

In one embodiment, an air supply device is provided on a rotating body having an air filling portion, into which air is filled, to supply air into the air filling portion, characterized in that the air supply device comprises a cylinder having an air introducing portion for introduction of air and an air discharging portion for discharging of air, a piston provided movably in the cylinder and moved by a centrifugal force generated by rotation of the rotating body, and force-applying means for applying force to the piston in a direction opposed to a direction of the centrifugal force, and that the centrifugal force is varied to cause reciprocation of the piston, and the reciprocation of the piston introduces air into the cylinder, and the air is discharged from the cylinder to be supplied to the air filling portion.

Preferably, the piston is moved by an increase in the centrifugal force in a direction away from a center of rotation of the rotating body to introduce air into the cylinder, and the piston is moved by a decrease in the centrifugal force to a direction opposed to the direction to discharge air from the cylinder to supply the air to the air filling portion.

Preferably, the piston is moved by a decrease in the centrifugal force in a direction toward a center of rotation of the rotating body to introduce air into the cylinder, and the piston is moved by an increase in the centrifugal force in a direction opposed to the direction to discharge air from the cylinder to supply the air to the air filling portion.

In one embodiment, the force-applying means comprises a spring. The invention may also include a check valve for introduction of air, provided in a flow passage through which air is introduced into the cylinder, to permit air flow directed into the cylinder and block air flow directed outside from the cylinder.

Preferably, the check valve for introduction of air is provided in the air introducing portion.

In a preferred embodiment, a check valve is provided for discharging of air, provided in a flow passage through which air is discharged from the cylinder and supplied to the air filling portion, to permit air flow directed outside from the cylinder and block air flow directed into the cylinder.

In an embodiment of the invention, an air filter is provided in a flow passage through which air is introduced into the cylinder, to block passing of foreign matters. Preferably, the air filter functions to block passing of a liquid.

The invention may also employ a pressure restricting means for restricting a maximum pressure in air filling portion. The pressure restricting means adjusts a compression ratio of air in the cylinder. The pressure restricting means also may be used to adjust a maximum distance of movement of the piston. Preferably, the pressure restricting means comprises an adjusting screw, which has a tip end adapted to abut against the piston and is screwed into the cylinder.

In a preferred embodiment, the rotating body comprises a tire unit having a wheel and a tire mounted on the wheel, and the air supply device is provided on the wheel. A valve is provided on the wheel to inject and discharge air from the tire, and the air supply device is provided to be communicated to an interior of the valve. The valve is provided on the wheel to inject and discharge air from the tire, and the air supply device is provided in a location separate from the valve. For example, the air supply device is provided on a side opposed to the valve with respect to a center of rotation of the wheel.

The invention also contemplates a wheel mounting thereon a tire and having the air supply device according to any of the concepts described above.

A tire unit comprising a wheel, a tire mounted on the wheel, and the air supply device, provided on the wheel, is also part of an embodiment of the invention.

DESCRIPTION OF THE PREFERRED EMBODIMENTS OF THE INVENTION

An air supply device, a wheel, and a tire unit, according to the invention, will be described below in detail on the basis of the preferred embodiments shown in the accompanying drawings. In addition, an explanation will be given below to the case where a rotating body having air filling portion, into which an air is to be filled, comprises a tire unit of an automobile.

Figure 1:
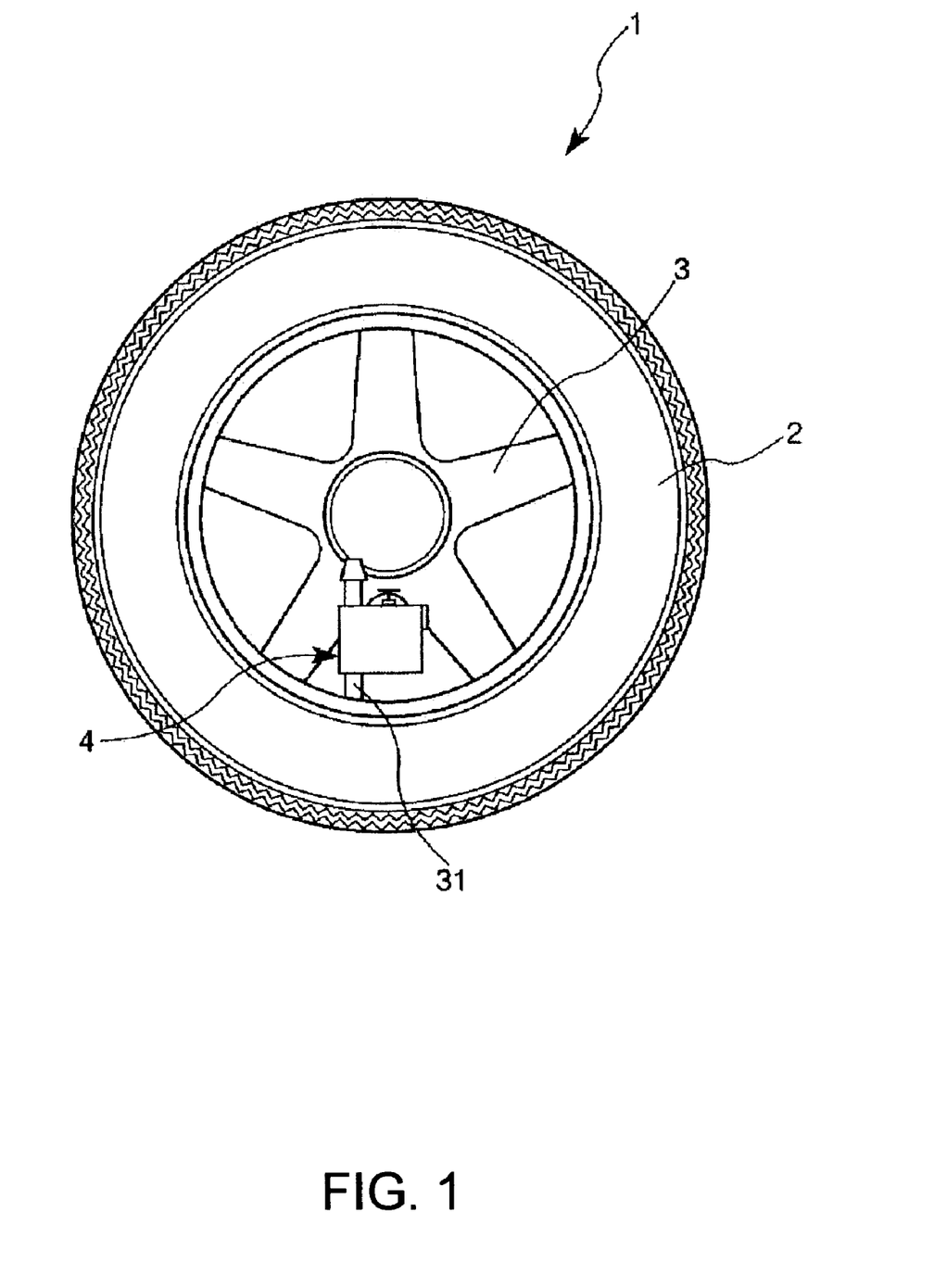
FIG. 1 is a side view showing a first embodiment of a tire unit according to the invention.
Figure 2:
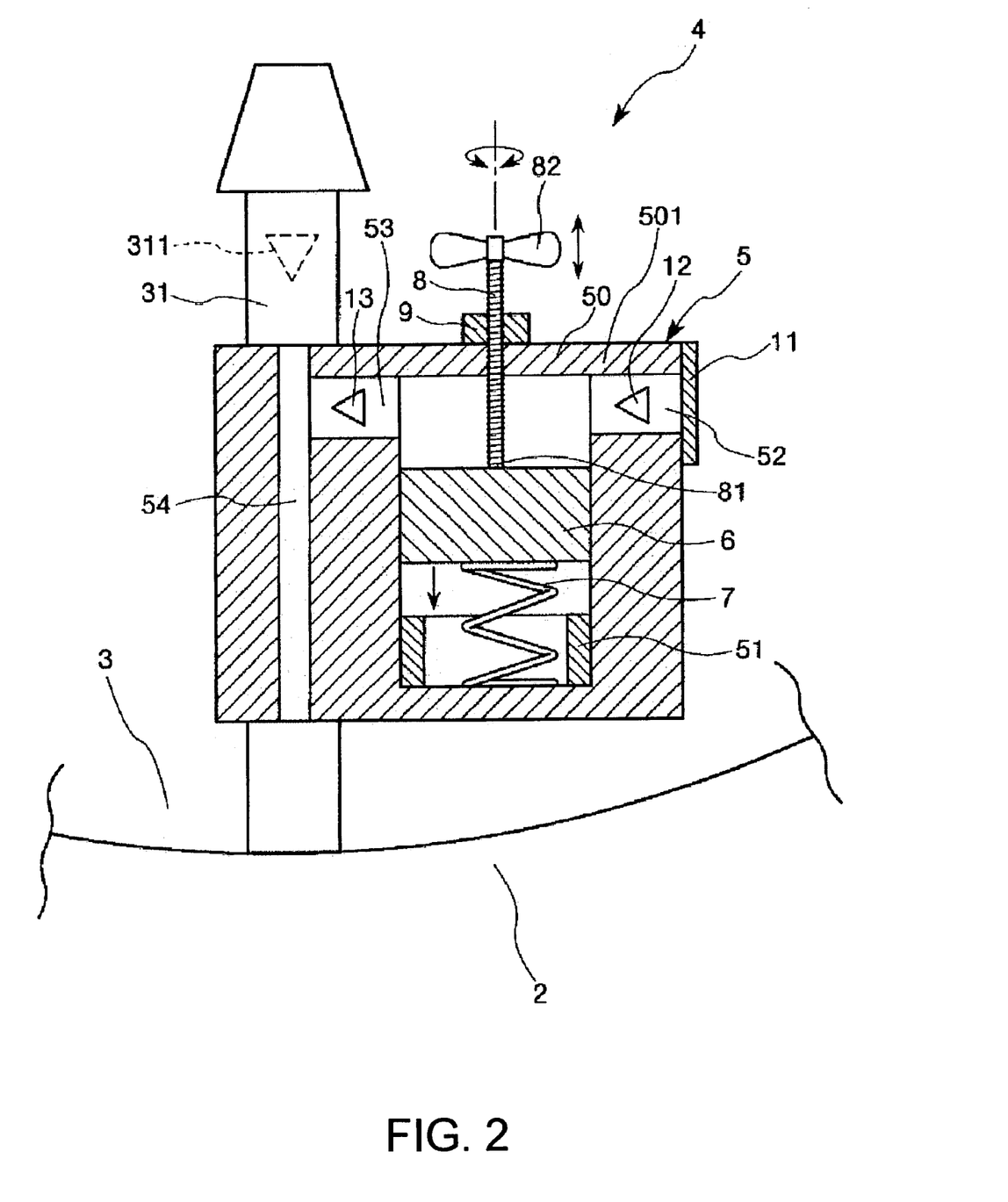
FIG. 2 is a vertical, cross sectional views showing an air supply device for the tire unit shown in FIG. 1.
Figure 3:
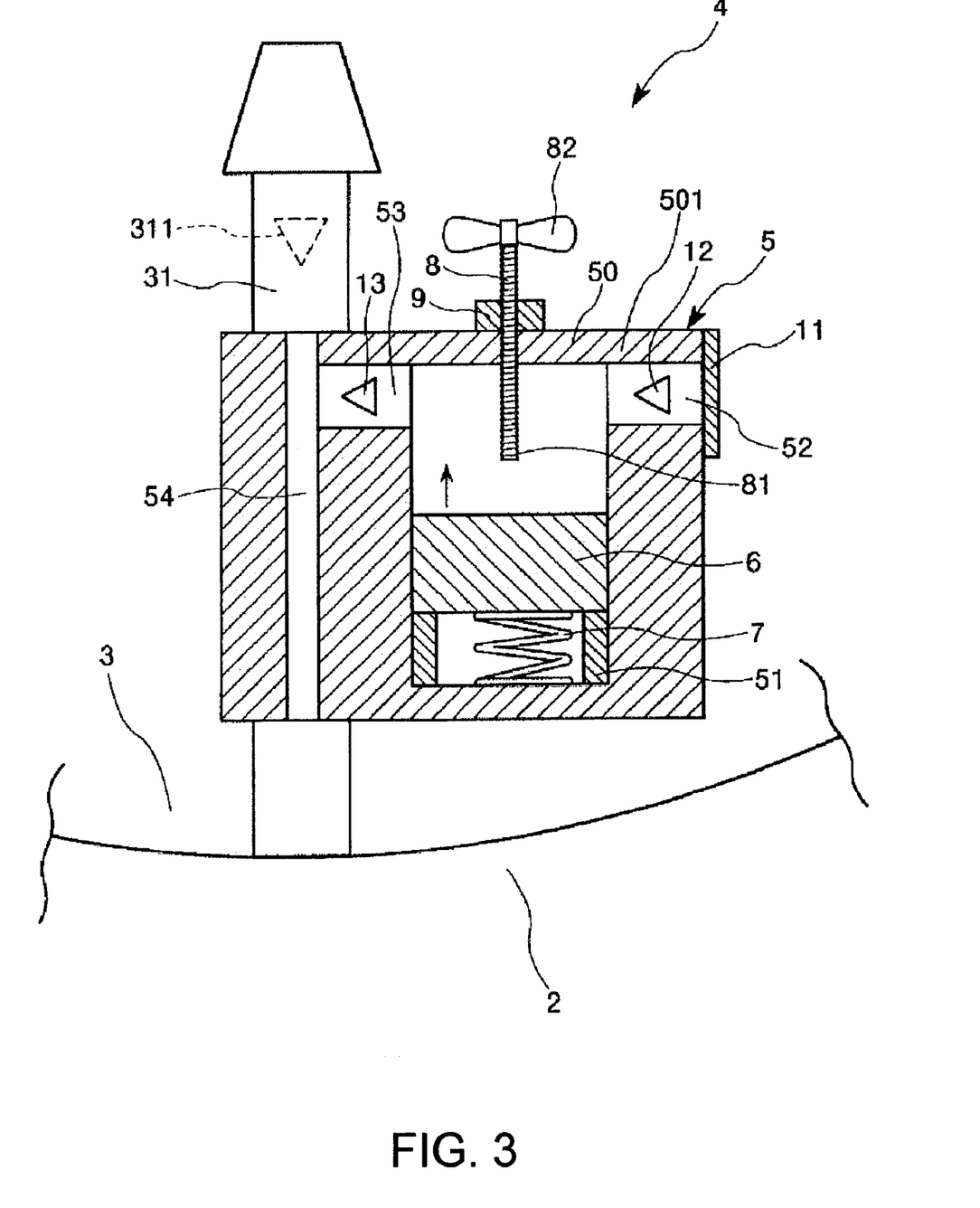
FIG. 3 is a vertical, cross sectional views showing the air supply device for the tire unit shown in FIG. 1.

FIG. 1 is a side view showing a first embodiment of a tire unit according to the invention, and FIGS. 2 and 3, respectively, are vertical cross sectional views showing an air supply device for the tire unit shown in FIG. 1. In the following explanation, a upward side in FIGS. 2 and 3 is referred to as "upward", a downward side is referred to as "downward", a rightward side is referred to as "rightward", and a leftward side is referred to as "leftward".

As shown in FIG. 1, the tire unit (rotating body) 1 comprises a wheel 3, a tire 2 mounted on the wheel 3, and an air supply device 4 for filling (injecting) air into an air filling portion, into which air is to be filled. The air filling portion of the tire unit 1 (tire 2) is composed of an inner peripheral surface of the tire 2, and a rim of the wheel 3. These constituents will be sequentially explained below.

As shown in FIG. 2, a valve 31 for injecting and discharging air from the air filling portion (referred below simply to as "tire") of the tire unit 1 (tire 2) is provided on the wheel 3. A check valve 311 (permitting passing of air only in one direction) is mounted on a tip end (upper end) of the valve 31 for permitting air flow directed into the tire 2 from outside and blocking air flow directed outside from the tire 2. The check valve 311 has the same construction and operation as those of a valve mounted on, for example, a conventional, common wheel.

An air supply device 4 is provided on the wheel 3. In the embodiment, the air supply device 4 is provided in the midway of the valve 31, that is, on a base end side (lower side) of the valve 31 from the check valve 311, such that a through-hole 54 (described later) is communicated to an interior of the valve 31 (flow passage of the valve 31). An explanation will be given below to the air supply device 4.

The air supply device 4 comprises a device body 5 provided with a cylinder 50, and a piston 6 movably mounted in the cylinder 50.

The through-hole 54 is formed on a left side of the cylinder 50 of the device body 5, extending along the flow passage of the valve 31, and the device body 5 is joined in the midway of the valve 31, that is, to the valve 31 below the check valve 311 so that the through-hole 54 is communicated to the flow passage of the valve 31.

A direction, in which the piston 6 is moved, corresponds to a radial direction of the tire unit 1 (wheel 3), and the piston 6 can be moved by a centrifugal force, which is generated by revolution of the tire unit 1.

A latch 51 for latching the piston 6 is formed in a lower portion (portion below the piston 6) within the cylinder 50.

Also, a port or air introducing portion 52 for introducing air into the cylinder 50 and a port or air discharging portion 53 for discharging air from the cylinder 50, respectively, are formed on lateral side of an upper portion (above the piston 6) of the device body 5.

The air introducing portion 52 comprises a through-hole for communication of an interior of the cylinder 50 with the outside, and in the midway, a check valve 12 for introduction of air (permitting passing of air only in one direction) is provided to permit air flow directed toward the interior of the cylinder 50 and to block air flow directed outside from the cylinder 50.

The check valve 12 is not necessarily positioned in the midway of the air introducing portion 52 but may be provided in an optional position in the flow passage through which air is introduced into the cylinder 50.

The air discharging portion 53 comprises a through-hole for communication of an interior of the cylinder 50 with the through-hole 54, and in the midway, a check valve 13 for discharging of air (permitting passing of air only in one direction) is provided to permit air flow directed outside from the cylinder 50 and to block air flow directed into the cylinder 50.

The check valve 13 is not necessarily positioned in the midway of the air discharging portion 53 but may be provided in an optional position in the flow passage, through which air is discharged from the cylinder 50 and supplied into the tire 2, for example, in the midway of the through-hole 54, or the like.

Desirably, the both check valves 12, 13 afford flowing and checking of air even when a difference in air pressure between an air inflow side and an air discharge side is slight.

Also, an air filter 11 is provided outside (rightward) the air introducing portion 52 of the device body 5 to block passing of foreign matters and liquid. The air filter 11 blocks (prevents) entry of foreign matters, such as sand, dust, or dirt, and liquid, such as water or oil, into the cylinder 50.

A coil spring (force-applying means) 7 is mounted below the piston 6 in the cylinder 50. The coil spring 7 is mounted in a state, in which it is contracted from a no-load state (natural length), its restoring force (elastic force) applying force to the piston 6 in a direction (direction toward a center of rotation of the tire unit 1) opposed to a direction of a centrifugal force generated by rotation of the tire unit 1 (wheel 3). In other words, the spring 7 is biased radially inwardly to oppose the radially outwardly centrifugal forces created by rotation of the wheel 3.

Also, an adjusting screw 8, which adjusts a compression ratio of air in the cylinder 50, is provided on the device body 5 as pressure restricting means for restricting a maximum pressure of air (maximum air pressure) in the tire 2.

The compression ratio of air in the cylinder 50 is a compression ratio of the air supply device 4 as a compressor, that is, a compression ratio value is obtained by dividing a whole volume (gap volume+stroke volume) of the cylinder 50, into which air is introduced, by a gap volume (the value is obtained by dividing a volume in the cylinder 50 when the piston 6 is disposed in a lowermost position, by a volume in the cylinder 50 when the piston 6 is disposed in a uppermost position). Hereafter, the compression ratio of air in the cylinder 50 is simply referred to as the "compression ratio".

The adjusting screw 8 comprises a tip end (abutting portion) 81 that abuts against the piston 6, and a grip portion (grip) 82, which is gripped with fingers, formed on a base end (upper end) of the screw.

The adjusting screw 8 is screwed into an upper wall 501 of the cylinder 50, and moved relative to the cylinder 50 in a vertical direction by means of a rotating operation.

Also, a sealing member (elastic member) 9 is provided outside the upper wall 501 of the cylinder 50 to seal a gap between the upper wall 501 and the adjusting screw 8 while permitting the adjusting screw 8 to rotate and move relative to the cylinder 50 in the vertical direction. The sealing member 9 keeps an airtight condition in the cylinder 50.

The piston 6 abuts against the tip end 81 of the adjusting screw 8 whereby a maximum distance (stroke) of movement of the piston 6, that is, the compression ratio is restricted, thereby restricting the maximum air pressure in the tire 2.

Accordingly, the rotation of the adjusting screw 8 enables adjusting the maximum distance of movement of the piston 6, that is, the compression ratio. Thus the maximum air pressure (target air pressure) in the tire 2 can be adjusted (set) to an optional value.

Also, a scale (not shown) is provided on the adjusting screw 8 to indicate a maximum air pressure in the tire 2, corresponding to a compression ratio restricted by the adjusting screw 8.

Materials of the piston 6 of the air supply device 4 are not specifically limited, but materials having a comparatively great specific gravity are preferable, for example, metals such as tungsten, and alloys.

Thereby, a great centrifugal force can be obtained while the piston 6 is made small. That is, pressure (compressive force of air) produced by the piston 6 can be increased while the air supply device 4 is made small in size.

Materials of the device body 5 are not specifically limited, but materials having a comparatively small specific gravity are preferable, for example, metals such as aluminum, and alloys. Thereby, such materials are advantageous in making the air supply device 4 lightweight.

An explanation will be given below for an operation of the air supply device 4 and so on.

As shown in FIG. 2, the restoring force (elastic force) of the coil spring 7 applies force to the piston 6 of the air supply device 4 in a direction (direction toward the center of rotation of the tire unit 1) opposed to the direction of a centrifugal force generated by rotation of the tire unit 1 (wheel 3), that is, upward. Thus the force-applying coil spring 7 causes the piston 6 to abut against the tip end of the adjusting screw 81 when an automobile stops and rotation of the tire unit 1 stops.

When an automobile departs and the tire unit 1 rotates, such rotation causes a centrifugal force (a force directed radially outward from the center of rotation of the tire unit 1) to act on the piston 6. With the acceleration of an automobile, the rotational speed (number of revolutions) of the tire unit 1 increases, thereby a centrifugal force acting on the piston 6 is increased.

When the centrifugal force is increased, the piston 6 is moved in a direction away from the center of rotation of the tire unit 1, that is, downward, against the force of the coil spring 7, so that the coil spring 7 is further contracted. Such movement of the piston 6 causes outside air to be introduced (sucked) into the cylinder 50 from the air introducing portion 52 via the air filter 11 and the check valve 12. At this time, the air filter 11 blocks (prevents) entrainment of foreign matters, such as sand, dust, or dirt, and a liquid, such as water or oil.

When a speed of the automobile, that is, the rotational speed of the tire unit 1 reaches a predetermined value, the piston 6 is latched (abuts against) by the latch 51 as shown in FIG. 3 to be stopped. Thereby, introduction of air into the cylinder 50 is stopped.

Conversely, the rotational speed of the tire unit 1 is decreased with deceleration of the automobile, thereby the centrifugal force acting on the piston 6 decreases.

When the centrifugal force decreases, the force of the coil spring 7 moves the piston 6 in a reverse direction (direction toward the center of rotation of the tire unit 1) of the above direction, that is, upward, whereby air within the cylinder 50 is compressed.

When the pressure (air pressure) of the compressed air exceeds the air pressure in the tire 2, the air within the cylinder 50 is discharged from the air discharging portion 53 via the check valve 13 and is fed into the tire 2 via the through-hole 54.

When the speed of the automobile, that is, the rotational speed of the tire unit 1 reaches a predetermined value, the piston 6 abuts against the tip end 81 of the adjusting screw 8 as shown in FIG. 2 to be stopped. Thereby, compression of air in the cylinder 50 is stopped.

Also, in response to the speed of the automobile, that is, the rotational speed (magnitude of the centrifugal force) of the tire unit 1, the piston 6 is moved to a predetermined position between the tip end 81 of the adjusting screw 8 and the latch 51.

In this manner, repetition of acceleration and deceleration of the automobile causes an increase or decrease (variation) in the centrifugal force acting on the piston 6, so that the piston 6 reciprocates between the tip end 81 of the adjusting screw 8 and the latch 51. Thereby, outside air is introduced into the cylinder 50, and air is fed into the tire 2 from the cylinder 50.

In this case, the compression ratio for the air supply device 4 is adjusted (set) to an appropriate value by means of the adjusting screw 8 in advance, and air is fed into the tire 2 until air pressure in the tire 2 reaches an air pressure (target air pressure) corresponding to the compression ratio.

More specifically, in the case where the air pressure in the tire 2 is decreased, the air supply device 4 feeds air into the tire 2, and when an air pressure in the tire 2 reaches an appropriate value (target air pressure), such feeding of air is not performed. Thereby, air pressure in the tire 2 is kept at an appropriate value.

In the case where a maximum air pressure (target air pressure) in the tire 2 is to be adjusted (set), a user (operator) grips the grip portion 82 of the adjusting screw 8, for example, with fingers to operatively turn the same in a predetermined direction.

Thereby, the adjusting screw 8 is moved downward or upward, a maximum distance (stroke) of movement of the piston 6, that is, a compression ratio is modified, and a target air pressure in the tire 2 is modified. In this case, when the adjusting screw 8 is moved downward, a maximum distance of movement of the piston 6, that is, a compression ratio is decreased and a target air pressure in the tire 2 is decreased, and when the adjusting screw 8 is conversely moved upward, a maximum distance of movement of the piston 6, that is, a compression ratio is increased and a target air pressure in the tire 2 is increased.

At the time of this operation, a user rotates and moves the adjusting screw 8 while looking at the scale provided on the adjusting screw 8 until an indicator (not shown) agrees with a target value on the scale. Thereby, it is possible to easily, rapidly and surely perform the adjustment.

As described above, with the air supply device 4, wheel 3, and the tire unit 1, it is possible to automatically and surely feed (inject) air into the tire 2 as the tire unit 1 rotates.

Thereby, even when an air pressure in the tire 2 is decreased, the air pressure can be increased and the air pressure in the tire 2 can be kept at an appropriate value.

Also, the maximum air pressure in the tire 2 can be restricted by means of the adjusting screw 8 without the provision of any release valve or the like.

Also, the adjusting screw 8 is used to adjust a compression ratio, thereby it is possible to adjust a maximum air pressure in the tire 2.

Also, the centrifugal force generated by rotation of the tire unit 1 moves the piston 6 to feed air into the tire 2, so that there is no need to use any energy source (for example, sources of electricity, fuel, high pressure, or the like).

Also, the air supply device 4 is lightweight and small in size, has a limited number of parts, and is simple in construction.

Also, no electric circuit, or electric control is necessary for the air supply device 4. Therefore, the device is high in reliability.

Also, the air supply device 4 can be easily mounted on the wheel 3. For example, the air supply device 4 can be easily mounted on an existent wheel 3.

Also, since the air supply device 4 is mounted on the wheel 3 (not mounted separately on a vehicle body and the wheel 3), it suffices to exchange only the wheel 3 or the air supply device 4 in the case where the air supply device 4 is to be exchanged, and the work can also be easily carried out.

Also, since the air supply device 4 is lightweight and small in size, it has less (little) influence on wheel balancing of the tire unit 1.

Also, the higher a speed of an automobile, the more important the wheel balancing of the tire unit 1. When an automobile travels at a high speed (speed above a predetermined value), the piston 6 is pushed against the latch 51 and fixed in the position by a centrifugal force. Thereby the wheel balancing can be kept constant. In particular, a state of good wheel balancing can be kept at the time of high-speed traveling by setting a good wheel balancing when the piston 6 abuts against the latch 51.

Also, when the tire 2 is completely deflated, for example, the tire 2 is first mounted on the wheel 3, a conventional compressor or the like for filling air into a tire can fill air into the tire 2 via the valve 31 and the check valve 311 up to a predetermined air pressure. Alternatively, a conventional compressor or the like is used to fill air nearly at a predetermined air pressure, and thereafter the air supply device 4 according to the invention can be used to fill air up to a predetermined air pressure.

In addition, according to the invention, the air supply device 4 may be provided in a position separate from the valve 31.

In this case, the air supply device 4 is preferably provided on a side opposed to the valve 31 with respect to a center of rotation of the wheel 3.

Subsequently, an explanation will be given to a second embodiment.

Figure 4:
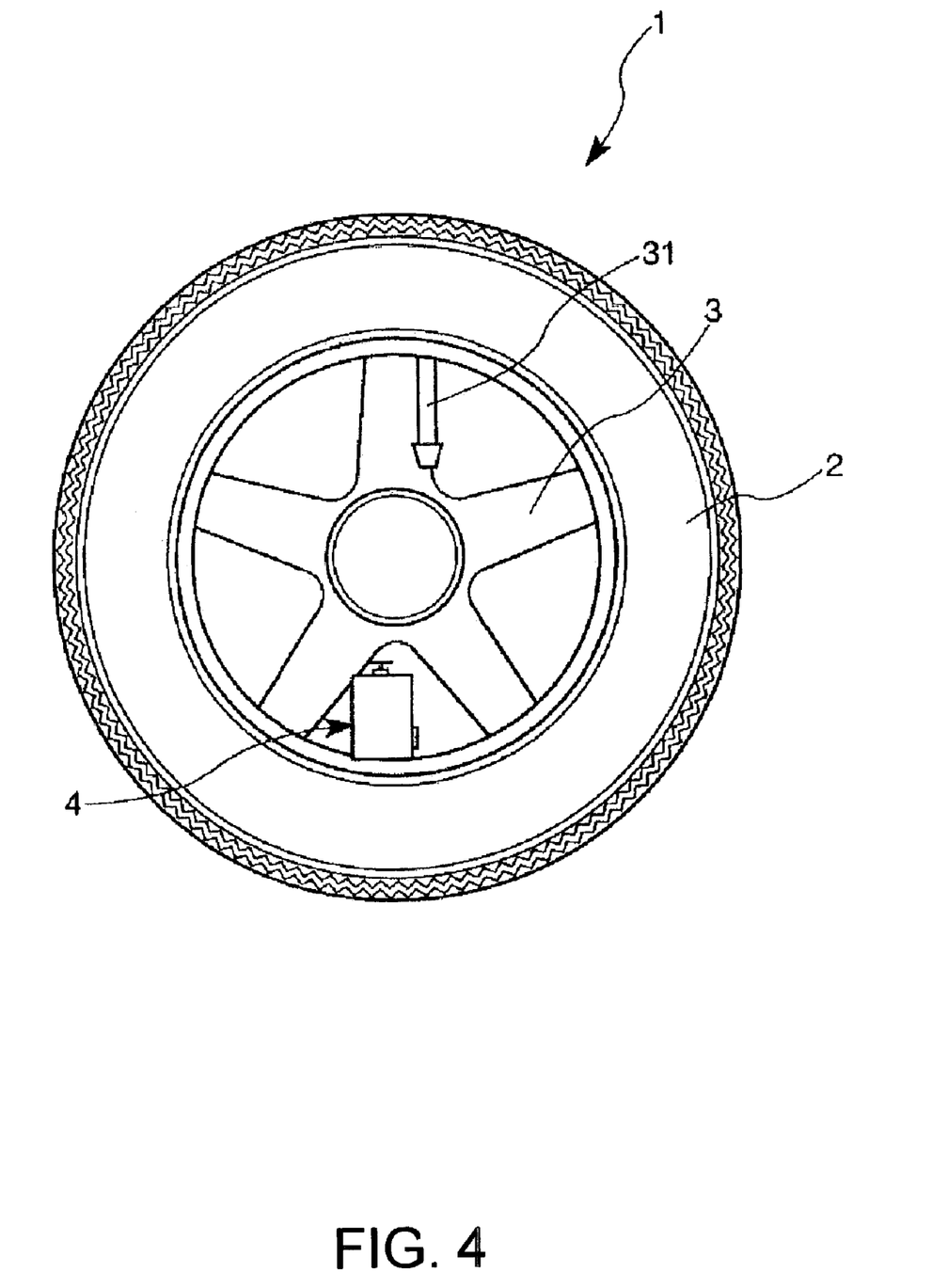
FIG. 4 is a side view showing a second embodiment of a tire unit according to the invention.
Figure 5:
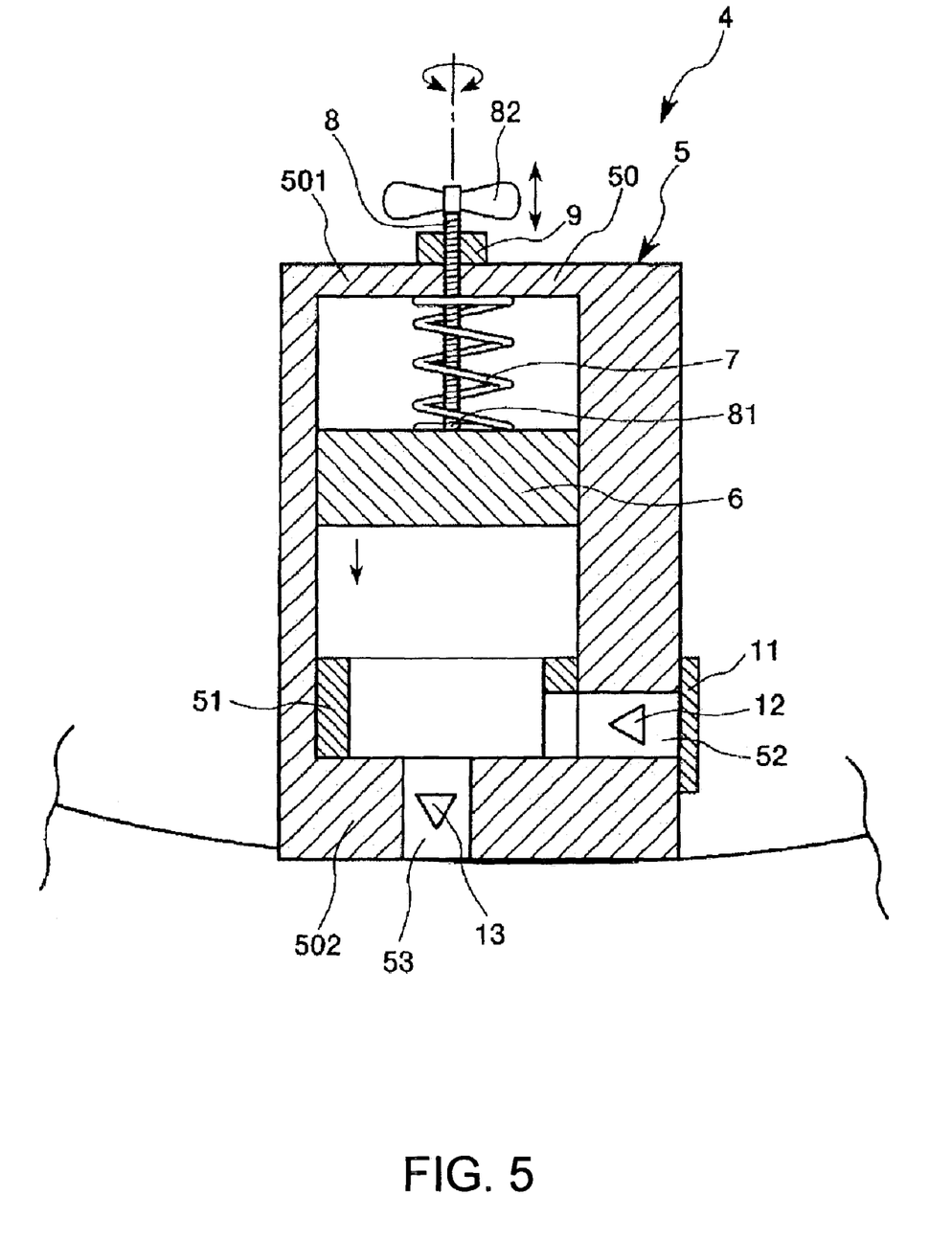
FIG. 5 is a vertical, cross sectional views showing an air supply device for the tire unit shown in FIG. 4.
Figure 6:
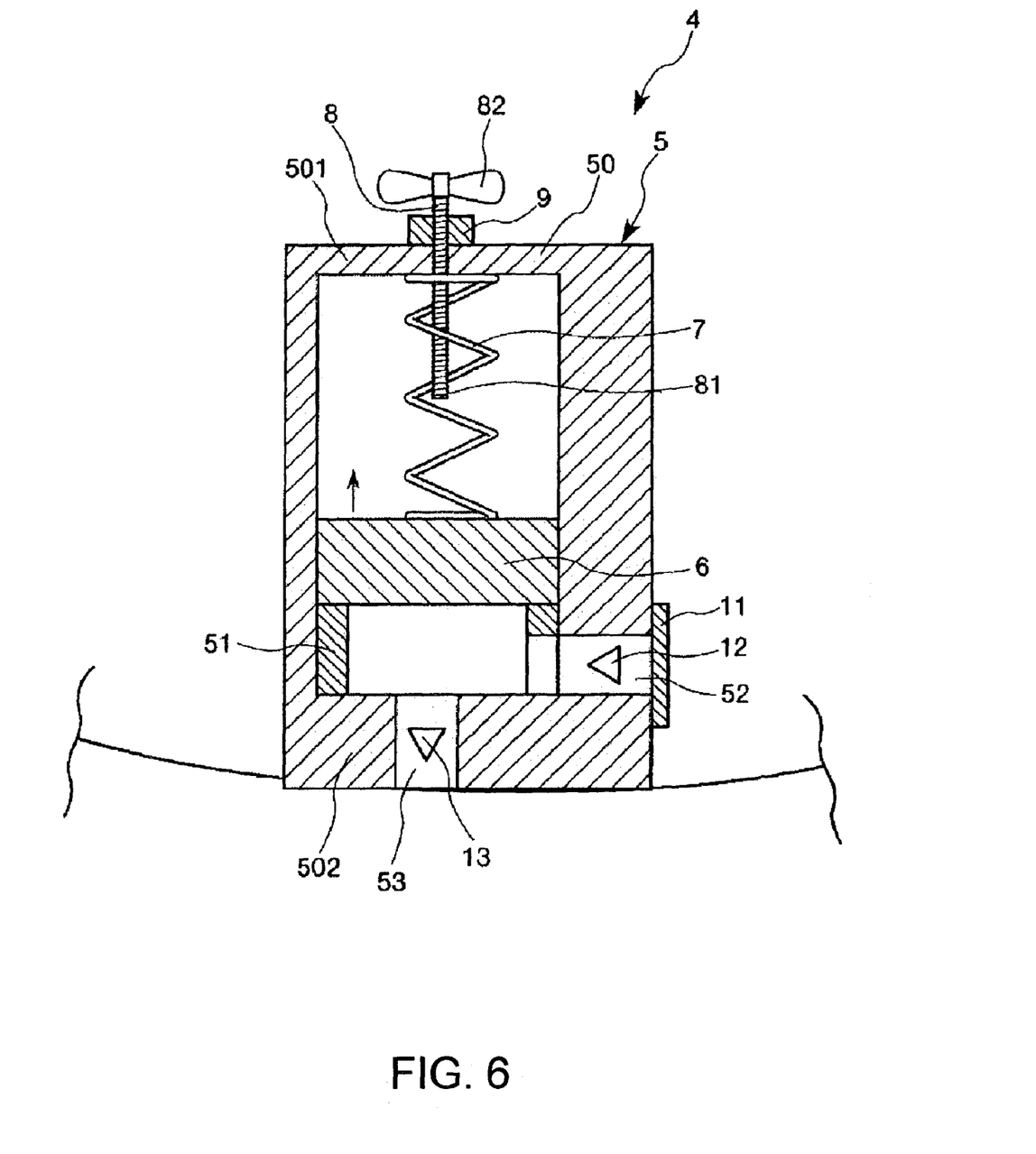
FIG. 6 is a vertical, cross sectional views showing an air supply device for the tire unit shown in FIG. 4.

FIG. 4 is a side view showing a second embodiment of a tire unit according to the invention, and FIGS. 5 and 6, respectively, are vertical cross sectional views showing an air supply device for the tire unit shown in FIG. 4. In addition, in the following explanation, an upward side in FIGS. 5 and 6 is referred to as "upward", a downward side is referred to as "downward", a rightward side is referred to as "rightward", and a leftward side is referred to as "leftward".

Subsequently, the second embodiment will be explained with respect to a difference between it and the first embodiment, and an explanation is omitted for the same matter.

As shown in FIG. 4, an air supply device 4 in the second embodiment is provided in a position separate from the valve 31 of the wheel 3.

In this case, as shown in FIG. 4, the air supply device 4 is preferably provided on a side opposed to the valve 31 with respect to a center of rotation of the wheel 3.

Thereby, it is possible to decrease, or dispense with a weight (balancer), which serves as wheel balancing for a tire unit 1.

As shown in FIG. 5, the air supply device 4 comprises a device body 5 provided with a cylinder 50, and a piston 6 movably mounted in the cylinder 50.

An air introducing portion 52 is formed on a lateral side of a lower portion (portion below the piston 6) of the device body 5, and an air discharging portion 53 is formed on a lower wall 502 of the device body 5.

The air introducing portion 52 comprises a through-hole for communication of an interior of the cylinder 50 with the outside, and the air discharging portion 53 comprises a through-hole for communication of an interior of the cylinder 50 with an air filling portion (hereafter, simply referred to as "tire") of the tire unit 1 (tire 2) via a hole (not shown) formed in the wheel 3.

Also, a coil spring (biasing means) 7 is mounted above the piston 6 in the cylinder 50.

The coil spring 7 is mounted in a state, in which it is expanded from a no-load state (natural length), its restoring force (elastic force) forcing the piston 6 in a direction (direction toward a center of rotation of the tire unit 1) opposed to a direction of the centrifugal force generated by rotation of the tire unit 1 (wheel 3).

Also, the air supply device 4 comprises an adjusting screw 8, sealing member 9, air filter 11, and check valves 12, 13. Because these parts are the same as those in the first embodiment, explanations for them are omitted.

Subsequently, an explanation will be given to an operation of the air supply device 4 and so on.

As shown in FIG. 5, the restoring force (elastic force) of the coil spring 7 forces the piston 6 of the air supply device 4 in a direction (direction toward the center of rotation of the tire unit 1) opposed to the direction of the centrifugal force generated by rotation of the tire unit 1 (wheel 3), that is, upward. Thus the force-applying coil spring 7 causes the piston 6 to abut against a tip end 81 of the adjusting screw 8 when an automobile stops and revolution of the tire unit 1 stops.

When an automobile departs and the tire unit 1 rotates, such rotation causes a centrifugal force (force directed radially outward from the center of rotation of the tire unit 1) to act on the piston 6. And as an automobile accelerates, the rotational speed (number of revolutions) of the tire unit 1 increases, thereby a centrifugal force acting on the piston 6 is increased.

When the centrifugal force is increased, the piston 6 is moved in a direction away from the center of rotation of the tire unit 1, that is, downward, against the force of the coil spring 7, and the coil spring 7 is further expanded, thereby air within the cylinder 50 is compressed.

When the pressure (air pressure) of the compressed air exceeds an air pressure in the tire 2, air within the cylinder 50 is discharged from the air discharging portion 53 via the check valve 13 to be fed into the tire 2.

When the speed of the automobile, that is, the rotational speed of the tire unit 1 reaches a predetermined value, the piston 6 is latched (abuts against) by the latch 51 as shown in FIG. 6 and is stopped. Thereby, compression of air in the cylinder 50 is stopped.

Conversely, the rotational speed of the tire unit 1 is decreased with deceleration of the automobile, thereby a centrifugal force acting on the piston 6 decreases.

When the centrifugal force decreases, the force of the coil spring 7 causes the piston 6 to be moved in a reverse direction (direction toward the center of rotation of the tire unit 1) of the above mentioned direction, that is, upward. Thereby, outside air is introduced (sucked) into the cylinder 50 from the air introducing portion 52 via the air filter 11 and the check valve 12.

When the speed of the automobile, that is, the rotational speed of the tire unit 1 reaches a predetermined value, the piston 6 abuts against the tip end 81 of the adjusting screw 8 as shown in FIG. 5 to be stopped. Thereby, introduction of air into the cylinder 50 is stopped.

Also, in response to the speed of the automobile, that is, the rotational speed (magnitude of the centrifugal force) of the tire unit 1, the piston 6 is moved to a predetermined position between the tip end 81 of the adjusting screw 8 and the latch 51.

In this manner, repetition of acceleration and deceleration of the automobile causes an increase or decrease (variation) in the centrifugal force acting on the piston 6, so that the piston 6 reciprocates between the tip end 81 of the adjusting screw 8 and the latch 51.

Thereby, air is fed into the tire 2 until air pressure in the tire 2 reaches an air pressure (target air pressure) corresponding to the compression ratio for the air supply device 4.

The air supply device 4, wheel 3, and the tire unit 1 take the same effect as that in the first embodiment.

In addition, the air supply device 4 may be provided, for example, in the midway of the valve 31 so as to be communicated to an interior of the valve 31 (flow passage of the valve 31).

Subsequently, displacement of the air supply device 4, pressure of the piston 6, or the like, in the tire unit 1 were found by calculation under the following conditions:

Inch size of wheel: 14 inches
Width of tire: 185 mm
Oblateness of tire: 60%
Outer diameter (diameter) of tire: 577.6 mm
Outer diameter (diameter) of wheel: 355.6 mm
Outer peripheral length of tire: 1814.584 mm
Speed of automobile: 60 km/h
Number of revolutions (rotational speed) of tire per hour: 33065.43 rph
Number of revolutions of tire per minute: 551.0905 rpm
Number of revolutions of tire per second: 9.184842 rps
Weight of piston: 5 g
Centrifugal force on piston: 0.30212 kgf (=2.960771 N)
Diameter of transverse section of piston: 3 mm
Area (cross sectional area) of transverse section of piston: 0.070686 $cm^2$
Pressure on piston: 4.274117 $kgf/cm^2$
Stroke of piston: 5 mm
Displacement of air supply device: 0.035343 cc ($cm^3$)

While common passenger cars require pressure in the order of about 1.8 to 2.2 $kgf/cm^2$, an air supply device 4 with displacement of 0.035343 cc and pressure of 4.274117 $kgf/cm^2$ on a piston 6 can be obtained under the above conditions to adequately meet the requirement.

While the air supply device, wheel and a tire unit according to the invention have been described on the basis of the embodiments (shown in figures), the invention is not limited thereto but configurations of the respective constituents can be replaced by optional ones having the same functions.

Also, two or more optional configurations (features) in the respective embodiments may be suitably combined together in the invention.

In addition, the air supply device according to the invention is not limited in use (rotating body) to tire units of automobiles but can be applied to various tire units (tire, wheel) of, for example, two-wheelers, bicycles, air planes, and vehicles in amusement parks, and the air supply device is not limited to tire units but can be applied to various rotating bodies, for example, floats, or the like, which are rotatable and have an air filling portion filled with air.

Also, the wheel and the tire unit according to the invention are not limited to wheels and tire units of automobiles, respectively, but may be various wheels and tire units of, for example, two-wheelers, bicycles, air planes, and vehicles in amusement parks, or the like.

As described above, according to the invention, it is possible to automatically and surely feed (inject) air into an air filling portion with revolution of a rotating body.

Thereby, even when the air filling portion is decreased in air pressure, the air pressure can be increased to keep air pressure in the air filling portion at an appropriate value.

Also, since a centrifugal force generated by rotation of a rotating body moves the piston to supply air into the air filling portion, there is no need to use any energy source (for example, sources of electricity, fuel, high pressure, or the like).

Also, the air supply device is lightweight and small in size, has a limited number of parts, and is simple in construction.

What is claimed is:

1. An air supply device for a rotating body having an air filling portion into which air is filled, comprising:
   a device body mounted on the rotating body and external of the air filling portion, the device body including a cylinder therein,
   a piston positioned within the cylinder and moveable along a longitudinal axis, wherein the piston is moved by a centrifugal force generated by rotation of the rotating body to supply air into the air filling portion,
   a pressure restricting means for restricting a maximum pressure in the air filling portion; and
   a latch disposed on an opposite side of the piston from the pressure restricting means and in selective engagement with the piston to define movement of the piston between the pressure restricting means and the latch;
   wherein the pressure restricting means adjusts a maximum distance of movement of the piston, and
   wherein the pressure restricting means comprises an adjusting screw movable along the longitudinal axis, which has a tip end adapted to abut against the piston and is screwed into the cylinder such that the maximum distance of movement of the piston is varied in accordance with the position of the screw along the longitudinal axis.

2. An air supply device for a rotating body having an air filling portion into which air is filled, comprising:
   a device body mounted to the rotating body and external of the air filling portion,
   a cylinder within the device body having an air introducing portion for introduction of air and an air discharging portion for discharging of air,
   a piston positioned within the cylinder and moveable along a longitudinal axis, wherein the piston is moveable in the cylinder and moved by a centrifugal force generated by rotation of the rotating body,
   a force-applying means located within the cylinder for applying force against the piston in a direction opposed to a direction of the centrifugal force;
   wherein the centrifugal force is varied to cause reciprocation of the piston, the reciprocation of the piston introduces air into the cylinder, and the air is discharged from the cylinder to be supplied to the air filling portion;

a pressure restricting means for restricting a maximum pressure in the air filling portion; and a latch disposed on an opposite side of the piston from the pressure restricting means and in selective engagement with the piston to define movement of the piston between the pressure restricting means and the latch;

wherein the pressure restricting means adjusts a maximum distance of movement of the piston, and wherein the pressure restricting means comprises an adjusting screw movable along the longitudinal axis, which has a tip end adapted to abut against the piston and is screwed into the cylinder such that the maximum distance of movement of the piston is varied in accordance with the position of the screw along the longitudinal axis.

3. The air supply device according to claim 2, wherein the piston is moved by a decrease in the centrifugal force in a direction radially toward a center of rotation of the rotating body to introduce air into the cylinder, and the piston is moved by an increase in the centrifugal force in a direction radially away from the center of rotation of the rotating body to discharge air from the cylinder to supply air to the air filling portion.

4. The air supply device according to claim 3, wherein the force-applying means comprises a spring.

5. The air supply device according to claim 4, further comprising a check valve in a flow passage, through which air is introduced into the cylinder, to permit air flow directed into the cylinder and block air flow directed out of the cylinder.

6. The air supply device according to claim 5, wherein the check valve is provided in the air introducing portion.

7. The air supply device according to claim 6, further comprising a second check valve for discharging of air, provided in a flow passage through which air is discharged from the cylinder and supplied to the air filling portion, to permit air flow directed out of the cylinder and block air flow directed into the cylinder.

8. The air supply device according to claim 7, wherein the second check valve for discharging of air is provided in the air discharging portion.

9. The air supply device according to claim 8, further comprising an air filter provided in a flow passage, through which air is introduced into the cylinder, to block passing of foreign matter.

10. The air supply device according to claim 9, wherein the air filter functions to block passing of liquids.

11. The air supply device according to claim 2, wherein the pressure restricting means adjusts a compression ratio of air in the cylinder.

12. The air supply device according to claim 2, wherein the rotating body comprises a tire unit having a wheel and a tire mounted on the wheel, and the air supply device is provided on the wheel.

13. The air supply device according to claim 12, wherein a valve is provided on the wheel to inject and discharge air from the tire, and the air supply device is provided in a location separate from the valve.

14. The air supply device according to claim 13, wherein the air supply device is provided on a side opposed to the valve, with a center of rotation of the wheel therebetween.

15. A wheel mounting thereon a tire and having the air supply device according to claim 1.

16. A tire unit comprising a wheel, a tire mounted on the wheel, and the air supply device, provided on the wheel, according claim 1.

17. The air supply device according to claim 2, further comprising a stop within the cylinder that abuts the piston when the rotational speed of the rotating body reaches a predetermined value.

* * * * *

UNITED STATES PATENT AND TRADEMARK OFFICE
CERTIFICATE OF CORRECTION

PATENT NO. : 7,117,910 B2  Page 1 of 1
APPLICATION NO. : 10/445709
DATED : October 10, 2006
INVENTOR(S) : Yutaka Akahori It is certified that error appears in the above-identified patent and that said Letters Patent is hereby corrected as shown below:

| | |
|---|---|
| Col. 2, Line 60 | "views" should be --view-- |
| Col. 2, Line 62 | "views" should be --view-- |
| Col. 2, Line 66 | "views" should be --view-- |
| Col. 3, Line 1 | "views" should be --view-- |
| Col. 3, Line 18 | "a" should be -- -an-- |
| Col. 4, Line 52 | "a" should be --an-- |
| Col. 10, Line 38 | "latch" should be --stop-- |
| Col. 10, Line 41 | "latch" should be --stop-- |
| Col. 11, Line 6 | "latch" should be --stop-- |
| Col. 11, Line 9 | "latch" should be --stop-- |

Signed and Sealed this

Twenty-fourth Day of April, 2007

JON W. DUDAS
*Director of the United States Patent and Trademark Office*